UNITED STATES PATENT OFFICE.

CHARLES BASKERVILLE, OF NEW YORK, N. Y., ASSIGNOR TO S. STERNAU & COMPANY, A COPARTNERSHIP COMPOSED OF SIGMUND STERNAU AND LIONEL STRASSBURGER, OF BROOKLYN, NEW YORK.

FUEL AND PROCESS OF MAKING THE SAME.

1,208,265.    Specification of Letters Patent.    Patented Dec. 12, 1916.

No Drawing.    Application filed January 11, 1916. Serial No. 71,406.

*To all whom it may concern:*

Be it known that I, CHARLES BASKERVILLE, a citizen of the United States, resident of the borough of Manhattan, city, county, and State of New York, have invented a certain new and useful Fuel and Processes of Making the Same, of which the following is a specification.

The objects I have in view are to produce a non-liquid fuel suitable for burning in lamps or stoves and which will not liquefy while it is burning.

Other objects will more fully appear from the following specification.

One way of carrying out my invention is to pour a saturated water solution of calcium acetate into ordinary ethyl alcohol. This produces a gel. Satisfactory proportions may be 10 to 15% calcium acetate solution of 85 to 90% alcohol. The same results are secured if denatured alcohol is employed, such consisting of ethyl alcohol with the addition of methyl alcohol or benzin (gasolene) or both. The product is a convenient and serviceable form of non-liquid alcohol which may be burned in suitable devices, such as lamps in the form of open top cans. On heating, the substance shows no tendency to melt and in fact the alcohol may thus be distilled away. There is also no tendency to melt when the substance is ignited.

I have found that if the mixture contains free mineral acid, alkali, or commonly recognized easily ionizable salts, such for example as sodium chlorid, the gel does not form or if it does form it is not permanent, or it may be liquefied by vigorous shaking. It then assumes the character of a thick soup. One of the objects of this invention is to produce a permanent gel.

I find in practice that a mixture made as hereinbefore described may be entirely jellified, but when some of the alcohol is burned the remaining substance may liquefy. This I attribute to the following: It is a well known fact, and one taken advantage of in the manufacture of acetone, that if calcium acetate be heated it decomposes into acetone and calcium carbonate. The reaction is expressed thus:

$$Ca(C_2H_3O_2)_2 = CaCO_3 + C_3H_6O.$$

It is also a well known fact that if calcium carbonate be heated it gives off carbon dioxid and changes into calcium oxid (quick lime). This coming into contact with water, slakes and produces calcium hydroxid, which is a substance with an alkaline reaction and ionizable. I have found that the presence of such an easily ionizable alkaline substance interferes with the desirable permanence of the gelatinous condition of the composition. If, therefore, the product made in accordance with the directions hereinbefore given be placed in a suitable container and then it be allowed to burn until a portion of the alcohol has been consumed and some alkaline material produced, as indicated, and combustion be stopped, and the remaining unconsumed material be kept for an appreciable time, a large portion, if not all of the remaining composition may liquefy. These are conditions which might be expected to obtain in the practical utilization of such a product.

In order to overcome the difficulties hereinbefore referred to, I have sought and found a weakly ionizable substance of acid nature which does not interfere with the formation or permanence of the gel and which will combine with the lime as the same is produced in the combustion referred to to form another weakly ionizable substance, in this case neutral, and thus preserve the permanence of the gel. One way to secure this is to proceed as follows: To alcohol containing a small percentage of stearic acid (say $\frac{1}{2}$ to 1%), I add 10 to 15 per cent. by volume, of a saturated water solution of calcium acetate. The mixture is shaken with sufficient vigor to bring about thorough intermingling, or it may be otherwise mixed. This may be done at room temperature and in the container in which the material is subsequently to be used, for it sets almost instantly into a gelatinous body. This body will burn when ignited, will not melt by the heat produced in its combustion, and will retain its gelatinous characteristics after partial burning, and in fact as long as the mass will burn.

I am also able to accomplish the same results by adding a small percentage of shellac (say one-half to one per cent.).

The proportions given are not necessarily followed. It is not necessary to produce the jelly in the container for I have found that the jelly may be so disintegrated by stirring or vigorous shaking as to become soupy in nature, when it may be poured into any other container. When so poured it solidifies on standing.

I do not understand why the mixture of calcium acetate and alcohol gels and it is possible that other similar substances will have the same properties. For this reason I do not limit myself to the substances hereinbefore specified.

Having now described my invention, what I claim as new and desire to secure by Letters Patent, is:

1. A fuel consisting of a jellied mixture of alcohol and a salt together with a substance which neutralizes any alkali which may be produced during the burning of the fuel.

2. A fuel consisting of a jellied mixture of alcohol and a salt together with an acid substance to prevent the formation of an alkali during the burning of the fuel.

3. A fuel consisting of a jellied mixture of alcohol and a salt, with a chemical means to prevent the formation of an alkali during the burning of the fuel.

4. A mixture of calcium acetate and alcohol in the form of gel.

5. A mixture of calcium acetate and alcohol in the form of a gel, said mixture containing a weakly ionizable substance of acid nature.

6. A mixture of calcium acetate and alcohol in the form of a gel, said mixture containing shellac.

7. The process of producing a fuel which consists in intimately mixing calcium acetate with alcohol.

8. The process of producing a fuel which consists in intimately mixing within the container in which it is to be burned, a solution of calcium acetate and alcohol.

9. The process of producing a fuel which consists in mixing a solution of calcium acetate and a solution of a weakly ionizable substance of acid nature with alcohol.

This specification signed and witnessed this 8th day of January, 1916.

CHARLES BASKERVILLE.

Witnesses:
BENJAMIN KARJVED,
J. HERBERT FENTRESS.

Copies of this patent may be obtained for five cents each, by addressing the "Commissioner of Patents, Washington, D. C."